(12) United States Patent
Langolf et al.

(10) Patent No.: US 10,311,006 B2
(45) Date of Patent: Jun. 4, 2019

(54) METHOD AND PERIPHERAL MODULE FOR TRANSMITTING HIGHWAY ADDRESSABLE REMOTE TRANSDUCER (HART) VARIABLES AND CPU UNIT FOR READING THE HART VARIABLES

(71) Applicant: Siemens Aktiengesellschaft, Munich (DE)

(72) Inventors: Carsten Langolf, Landau (DE); Norbert Rottmann, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 229 days.

(21) Appl. No.: 15/217,807

(22) Filed: Jul. 22, 2016

(65) Prior Publication Data

US 2017/0031856 A1 Feb. 2, 2017

(30) Foreign Application Priority Data

Jul. 31, 2015 (EP) ..................................... 15179422

(51) Int. Cl.
*G06F 12/00* (2006.01)
*G06F 13/40* (2006.01)
*G05B 19/042* (2006.01)
*G06F 13/42* (2006.01)

(52) U.S. Cl.
CPC ....... *G06F 13/404* (2013.01); *G05B 19/0423* (2013.01); *G06F 13/4286* (2013.01); *G05B 2219/25428* (2013.01)

(58) Field of Classification Search
None
See application file for complete search history.

(56) References Cited

U.S. PATENT DOCUMENTS 6,449,715 B1 * 9/2002 Krivoshein ........ G05B 19/4185
700/1
9,397,855 B2 * 7/2016 Borgeson .......... H04L 12/40006
2008/0141271 A1 6/2008 Gilboa et al.

* cited by examiner

*Primary Examiner* — Cheng Yuan Tseng
(74) *Attorney, Agent, or Firm* — Cozen O'Connor

(57) ABSTRACT

A peripheral module for connecting Highway Addressable Remote Transducer (HART) field devices provides different HART variables to the input area of its address space for cyclic reading by a CPU unit and continuously updates these HART variables, wherein a communication area for transmitting an individual HART variable is provided in the input and output area of the address space, where the CPU unit writes a command, which specifies the current HART variable to be read, into the output area of the communication area and the peripheral module provides and updates the specified HART variable in the input area of the communication area until a time at which the CPU unit writes a new command, which specifies another HART variable to be read, into the output area in order to make the transmission of all potentially available HART variables possible in a simple manner.

16 Claims, 4 Drawing Sheets

METHOD AND PERIPHERAL MODULE FOR TRANSMITTING HIGHWAY ADDRESSABLE REMOTE TRANSDUCER (HART) VARIABLES AND CPU UNIT FOR READING THE HART VARIABLES

BACKGROUND OF THE INVENTION

1. Field of the Invention

The invention relates to a method, a peripheral module, and a CPU unit for reading Highway Addressable Remote Transducer (HART) variables from the peripheral module.

2. Description of the Related Art

Process control systems are used for automation of processes in technical plants. The automated processes can, for example, involve process or production engineering processes, or processes for generation or distribution of electrical energy.

Process control systems, such as PCS 7 from Siemens, are usually structured hierarchically by a number of levels. At the field level, the states of the technical process are detected by field devices (sensors) or the process is explicitly influenced (actuators). At the control level, CPU units (as components of programmable logic controllers (PLC)) execute field-related open-loop and closed-loop control functions, where possible in real time, and thus in a calculable manner, where they receive signals from the sensors, e.g., from a pressure measuring transducer, and issue commands to the actuators, e.g., a positioner for a closed-loop control valve. At the process management level, the superordinate open-loop and closed-loop control occurs in control computers, where an operator system consisting of one or more operator stations makes it possible for the operating personnel of the plant to operate and monitor the process.

Data is usually exchanged between the field devices and the CPU units via a digital field bus, such as PROFIBUS DP or PROFINET. The field devices do not normally themselves have a corresponding field bus connection. As a result, the field devices are linked via decentralized peripheral stations to the digital field bus. A peripheral station consists of an interface module (head module) for connection to the digital field bus and a number of peripheral modules (digital and analog input and output modules) for connection of the field devices. Each peripheral module has one or more channels, where a field device can be connected to each channel in each case. A widely-used communication protocol for field devices is Highway Addressable Remote Transducer (HART), in which the main process value, such as a pressure measurement value, is transmitted as an analog 4-20 mA current signal onto which further data (so-called HART variables, e.g., the temperature of the pressure sensor) can be modulated via Frequency Shift Keying (FSK) and can be digitally transmitted. In this case, the peripheral module converts a 4-20 mA measurement signal from the process, for example, into a suitable digital data format for the CPU unit or transforms a digital output value into an analog setting signal for the process.

For performing the field-related open-loop and closed-loop control functions automation programs are executed cyclically in the CPU units. If, in such cases, data from the process is processed, the program usually accesses a process image of the inputs, into which, at the beginning of the cycle, all data of the input modules is read and stored at once. During the execution of the program, the results are written into the process image of the outputs and transferred from there into the output modules after execution of the program. Accordingly, each peripheral module has an address space (useful data area) with an input and/or output area for its input and/or output data, where the input data provided in the input area is updated continuously by the peripheral module. The size of the address space is limited.

A HART field device, in addition to the digitized 4-20 mA main process value, can make up to four HART variables available. Each HART variable consists of a 4-byte value and a 1-byte quality code, i.e., occupies 5 bytes. A HART peripheral module realized as a channel-granular peripheral module makes it possible to connect 16 HART field devices, for example, so that, during operation, the HART peripheral module must constantly make available up to 64 HART variables with 320 bytes for evaluation by the assigned CPU unit. In addition, there are the 16 analog main process values that are each represented with, e.g., 2 bytes and thus require a further 32 bytes. By contrast, in each peripheral module, an address space of only 16 or 32 bytes is available for complete process execution, which greatly restricts the number of HART variables able to be planned into the project (able to be mapped) in the address space of the peripheral module. In the process control system, it is often necessary to make it possible to access all the HART variables made available by it. A re-parameterization, i.e., a modification of the mapping specification, is not permitted during the run time of the CPU unit and moreover is undesired, because this can lead to the technical plant stopping. Likewise, it is not desirable for HART variables to be read via "datasets" (larger, contiguous data packets) for process control from a peripheral module, because the timing of these asynchronous transport services is unable to be calculated and usually a number of peripheral modules are not accessible simultaneously. The user must therefore define in advance which HART variables are needed for his automation solution in the address space of the peripheral module.

Basically, the above-described problem can be resolved by expanding the address area of the peripheral module. However, a further restriction exists in the cyclic exchange of data between the interface module and the CPU unit. Thus, for example, a PROFINET telegram can transport up to 1440 bytes of process data. This contrasts, however, such as for 56 HART peripheral modules in a peripheral station with 16 channels each, with 56×16×4×5=17920 bytes of HART variables to be transmitted.

SUMMARY OF THE INVENTION

It is therefore an object of the invention to make it possible, in a simple manner or with simple means, to transmit all potentially available HART variables.

This and other objects and advantages are achieved in accordance with the invention by a peripheral module and method for transmitting different HART variables from a peripheral module used for connection of HART field devices into a CPU unit of a programmable logic controller (PLC), where the peripheral module has an address space with an input area and an output area and provides the HART variables in the input area, which is continuously updated by the peripheral module and is read cyclically by the CPU unit. In accordance with the invention, a communication area for transmitting an individual HART variable is provided in the input and output area of the address space, where the CPU unit writes a command, which specifies the current HART variable to be read, into the output area of the communication area, and where the peripheral module provides and updates the specified HART variable in the input area of the communication area until a time at which the CPU unit writes a new command, which specifies another HART variable to be read, into the output area.

It is also an object of the invention to provide a peripheral module for connecting HART field devices and for transmitting different HART variables into a CPU unit of a programmable logic controller (PLC), where the peripheral module has an address space with an input area and an output area and is configured to provide the HART variables in the input area of an address space for cyclic reading by the CPU unit and to update them continuously. In accordance the invention, a communication area for the transmission of an individual HART variable is provided in the input and output area of the address space and the peripheral module is further configured to receive, in the output area of the communication area, a command of the CPU unit specifying the current HART variable to be read and to provide and update the respectively specified HART variable in the input area of the communication area until a time at which the peripheral module receives a new command, which specifies another HART variable to be read, in the output area.

The command includes an identification of the HART variable to be read (variable ID) and, with a multi-channel embodiment of the peripheral module, also includes an identifier of the channel (channel number) that is delivering the HART variable.

Each HART variable to be read by the CPU unit is preferably provided, together with an acknowledgement corresponding to the command, in the input area of the communication area, so that the CPU unit can establish the correctness of the read HART variable.

When the CPU unit requests a new HART variable with a new command, the current acknowledgement is set in the input area of the communication area of the peripheral module to a value that identifies the currently provided HART variable as invalid until a point time that the new HART variable is provided with the associated acknowledgement.

The provided HART variable (4-byte value and 1-byte quality code) and the acknowledgement (1 byte) together only need 6 bytes, depending on the size of the address area of the peripheral module. Consequently, two or more communication areas can also be realized and thus different HART variables provided at the same time, which are specified independently of one another by commands in the output area. The different HART variables provided at the same time are transmitted cyclically together in a telegram to the CPU unit.

The disclosed embodiments of the invention make it possible to access all HART variables of a peripheral module independently of a parameterization of the peripheral module, i.e., the user is no longer forced to define by parameterization which HART variables he needs for his automation solution. As before, the process map of the respective current inputs and outputs continues to be provided via the address space of the peripheral module.

Also as previously explained, the peripheral linkage is preferably abstracted in the CPU unit by channel blocks (drivers). In this case, within the framework of the invention, a channel block advantageously represents a predetermined number, preferably 8 HART variables, which are specified as input parameters. The channel block processes all HART variables specified as input parameters, in that in each case it reads the current value of the corresponding HART variables from the at least one communication area from the peripheral module and provides this value at an output. The outputs are retained until the next reading.

Preferably, the channel block is configured such that it can be cascaded. In this case, each block has an "enabling input" (EN) and an "enabling output" (ENO). A number of blocks can be chained to one another via EN and ENO, so that the downstream blocks can only be processed when the blocks upstream from them are operating without errors.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For further explanation of the invention, reference is made below to the figures of the drawing, in which.

DETAILED DESCRIPTION OF THE EXEMPLARY EMBODIMENTS

Figure 1:
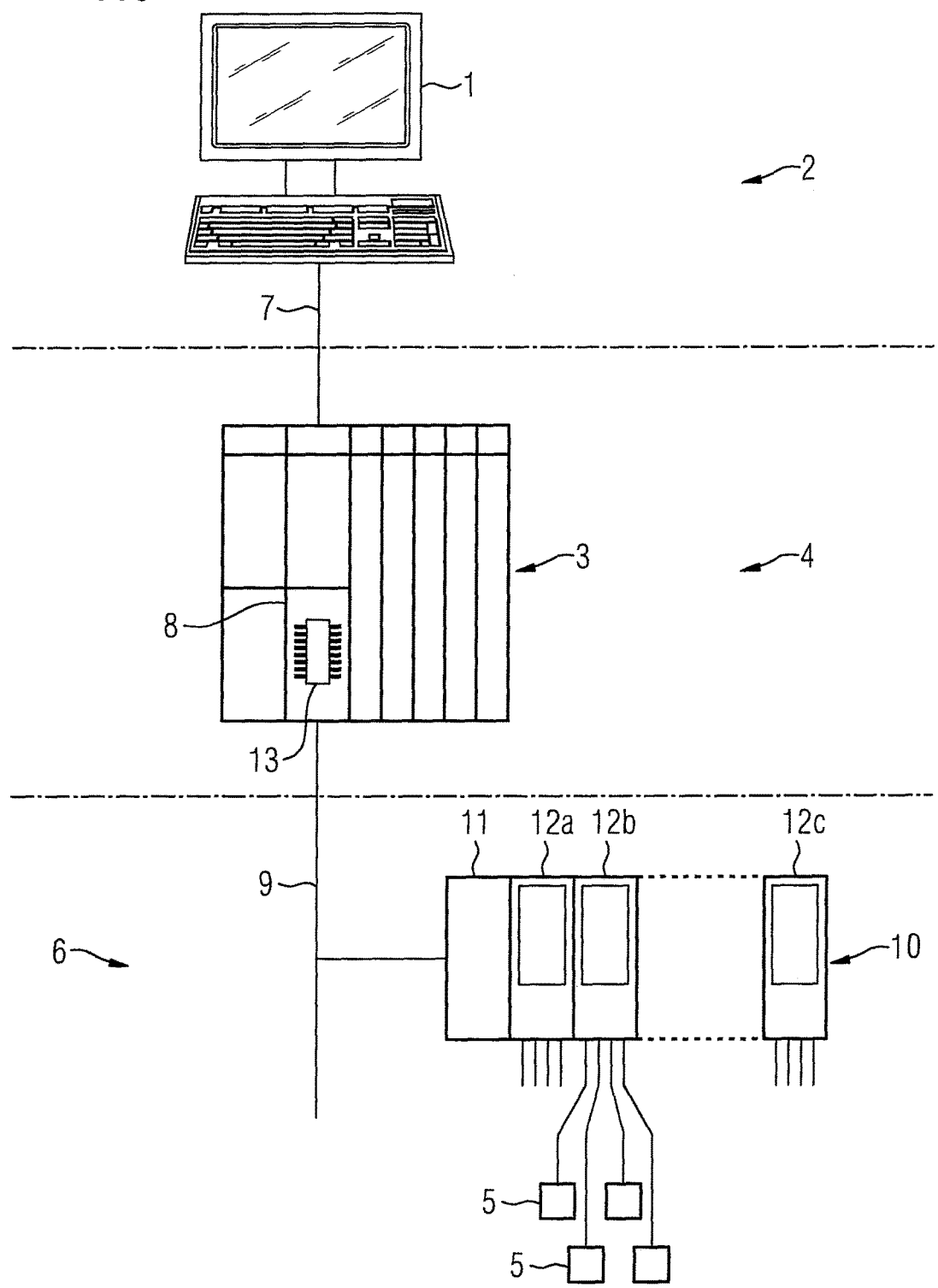
FIG. 1 shows a section from a process control system with a peripheral module.

FIG. 1 shows a schematic block diagram of a section for a process control system with an operator station 1 at a process management level 2, a stored-program controller (SPS) 3 at control level 4 and field devices 5, which at field level 6 detect states of a technical process (sensors) or explicitly influence the process (actuators). The operator station 1 and the programmable logic controller 3 are connected to one another via a plant bus 7 (e.g., Ethernet). The stored-program controller 3, in addition to further modules, has a CPU unit 8, which executes a control or user program and, in doing so, processes input data of the sensors received via a digital field bus 9 (e.g., PROFIBUS DP) and creates output data for the actuators. The field devices 5 are linked via a decentralized peripheral station 10 to the digital field bus 9. The peripheral station 10 consists of an interface module (head module) 11 for connection to the digital field bus 9 and a number of peripheral modules 12*a*, 12*b*, 12*c*. As shown by an example of one of these peripheral modules 12*b*, these each have a number of channels, here e.g. four channels, to which in each case one of the different field devices 5 can be connected. In the example shown, this involves HART field devices and HART peripheral modules. In the CPU unit 8, the peripheral linkage is preferably abstracted by one or more channel blocks (drivers) 13.

Figure 2:
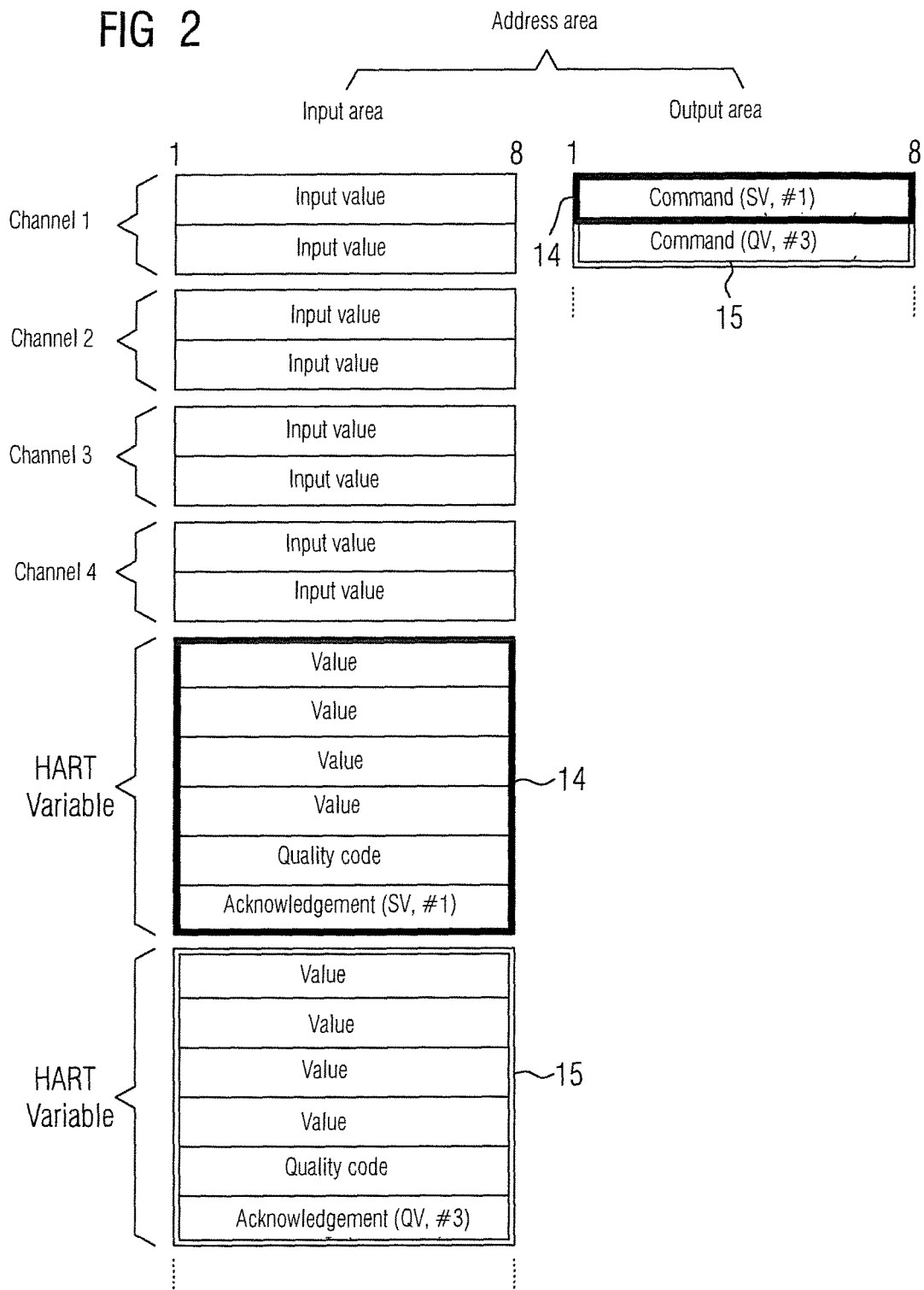
FIG. 2 shows an example for the occupation of the address space in the peripheral module in accordance with the invention.

FIG. 2 shows an example of the address space (user data area) of a peripheral module, e.g. 12*b*, with an input area and an output area. Input data for the CPU unit 8 is provided in the input area. Output data of the CPU unit 8 is written into the output area.

The first 8 bytes of the input area are claimed by the 4-20 mA main process values (input values), which are received from the field devices 5 via the four channels and are continuously updated.

In addition, in the input and output area of the address space, a communication area 14 is defined for the transmission of an individual HART variable. In this case, the HART variable provided in the input area of the communication area 14 occupies 6 bytes, of which 4 bytes are for the value of the HART variable, 1 byte is the quality code and 1 byte is the acknowledgement. The acknowledgement contains, e.g., in the first 4 bits, an identification of the HART variables to be read and, e.g., in the remaining 4 bits, the channel number of the channel of the peripheral module 12b delivering the HART variable. The acknowledgement sensibly corresponds to the command that is written by the CPU unit 8 into the output area of the communication area 14 to specify and request the HART variable to be provided in the input area. The HART variable (i.e., its value) provided in the input area of the communication area 14 is continuously updated by the peripheral module 12b and is read cyclically, together with the acknowledgement identifying it, from the CPU unit 8, where the HART variable is transmitted, together with further HART variables from the other peripheral modules 12a, 12c or, as will be explained below, of the same peripheral module 12b in a telegram via the digital field bus 9. The CPU unit 8 reads the values of the HART variables together with the associated acknowledgements. The acknowledgments are evaluated by an evaluation program in the CPU, such as in the channel block 13, so that the block recognizes whether the HART variables provided correspond to the requested HART variables.

When a new command is written into the output area of the communication area 14, the peripheral module 12b modifies the acknowledgement of the HART variables provided (specified by the earlier command) in the input area to a predetermined value that identifies the HART variable still provided as invalid until a time at which this has been replaced by the new HART variable with the associated acknowledgement. The value of the new HART variables is continuously updated by the peripheral module 12b and read cyclically from the CPU unit 8, until the unit requests the provision of a new HART variable by a new command.

In the peripheral module 12b, as also in the other peripheral modules 12a, 12c, up to four different HART variables (Primary Variable (PV), Secondary Variable (SV), Tertiary Variable (W), Quaternary Variable (QV)) can be made available in each case by each of the field devices 5 connected to the channels #1 to #4. In the example shown, the Secondary Variable (SV) from the channel #1 is currently being provided in the communication area 14.

In the exemplary embodiment shown, a further communication area 15 for the transmission of a further HART variable is defined in the input and output area of the address space of the peripheral module 12b, so that two HART variables independent of one another, specified by commands, are provided in parallel or at the same time. In the example shown, these are currently the previously mentioned Secondary Variable (SV) from channel #1 and the Quaternary Variable (QV) from channel #3. Via the two communication areas 14, 15 all HART variables of the peripheral module 12b can be read independently of each other, two HART variables of which can be read at the same time in each case.

Only the length of the telegram intended for the transmission on the digital field bus 9 restricts the number of HART variables that can be read from all peripheral modules 12a, 12b, 12c at the same time.

Figure 3:
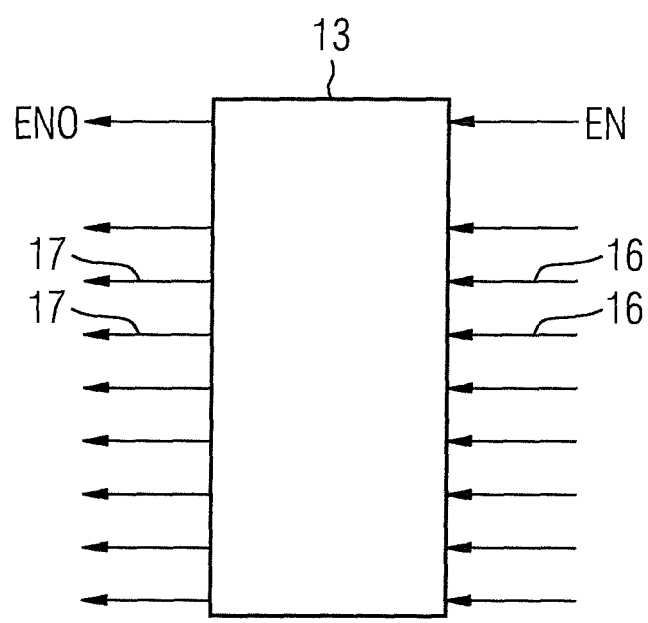
FIG. 3 shows an example for a channel block that can be cascaded in accordance with the invention.

FIG. 3 shows an example for the at least one cascadable channel block 13 in the CPU unit 8. The channel block 13 represents eight different HART variables that are specified as input parameters. At its eight inputs 16, the channel block 13 processes the HART variables specified as input parameters sequentially, in that in each case it reads the current value of the corresponding HART variable from the communication area 14 or 15 from the peripheral module 12a, 12b, 12c concerned and provides it at an output 17. The outputs 17 are retained until the next read.

The processing of the channel block 13 can be linked to an enabling signal via an enabling input EN. The block 13 is then only processed if this signal has the value "1". After the block 13 is called, the signal "1" is conducted to an enabling output ENO. In the case of incorrect processing, on the other hand, the signal "0" is conducted to the enabling output ENO. This is, e.g., the case if the channel block 13 detects during the evaluation of the acknowledgement of a read HART variable that the variable does not correspond to the requested HART variable. Thus, a number of blocks can be cascaded via the enabling input EN and enabling output ENO, so that each downstream block can only be processed if the blocks upstream from them are operating without errors.

Figure 4:
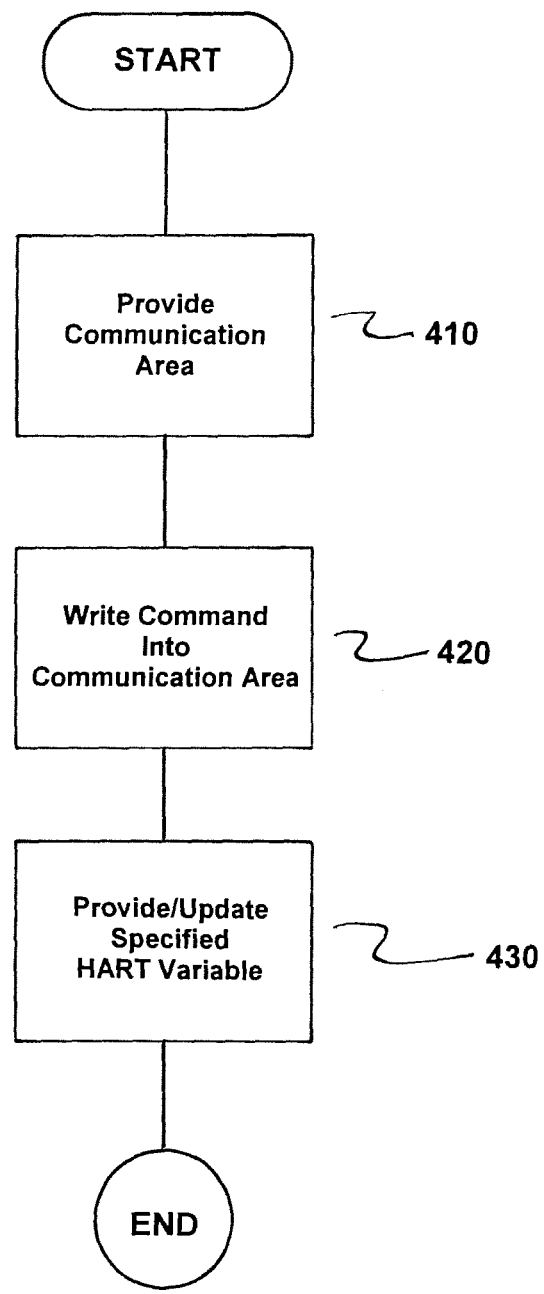
FIG. 4 is a flowchart of the method in accordance with the invention.

FIG. 4 is flowchart of a method for transmitting different Highway Addressable Remote Transducer (HART) variables from a peripheral module 12a, 12b, 12c for connection of HART field devices 5 into a CPU unit 8 of a programmable logic controller PLC 3, where the peripheral module 12a, 12b, 12c includes an address space with an input area and an output area and provides the HART variables within the input area which are continuously updated by the peripheral module 12a, 12b, 12c and are cyclically read by the CPU unit 8. The method comprises providing a communication area 14 for transmission of an individual HART variable in the input and output area of the address space, as indicated in step 410.

Next, the CPU unit (8) writes a command into the output area of the communication area (14), as indicated in step 420. Here, the command specifies the HART variable currently to be read.

The peripheral module (12a, 12b, 12c) now provides and updates the specified HART variable in the input area of the communication area (14) until a time at which the CPU unit (8) writes a new command which specifies another HART variable to be read into the output area, as indicated in step 430.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting different Highway Addressable Remote Transducer (HART) variables from at least one HART field device via a peripheral module into a central processing unit (CPU) of a programmable logic controller, the at least one HART field device and the programmable logic controller being connected via buses to the peripheral module, and the peripheral module including an address space with an input area for data to be read by the CPU and an output area for data to be written by the CPU, the method comprising:
providing, in the input and output area of the address space, a communication area for transmission of an individual HART variable from the peripheral module to the CPU of the programmable logic controller;
writing, by the CPU, a command into the output area of the communication area, said command specifying the HART variable currently to be read;
providing, by the peripheral module, the specified HART variable in the input area of the communication area;
cyclically reading, by the CPU, the specified HART variable in the input area of the communication area; and
updating continuously, by the peripheral module, the specified HART variable in the input area of the communication area until a time at which the CPU writes a new command which specifies another HART variable to be read into the output area.

2. The method as claimed in claim 1, wherein, with a multi-channel embodiment of the peripheral module for connection of a number of HART field devices, each specification of the HART variable to be read also specifies a channel that is delivering this HART variable.

3. The method as claimed in claim 1, wherein each HART variable to be read is provided in the input area together with an acknowledgement corresponding to the command.

4. The method as claimed in claim 2, wherein each HART variable to be read is provided in the input area together with an acknowledgement corresponding to the command.

5. The method as claimed in claim 1, further comprising:
providing at least one further communication area in the input and output area of the address space of the peripheral module for transmitting a further HART variable, such that HART variables specified by commands are provided independently of one another in parallel in at least two communication areas.

6. The method as claimed in claim 1, wherein the HART variables to be read are read in by the CPU via inputs of at least one channel block and are provided at outputs;
wherein the at least one channel block represents a predetermined number of different HART variables that are specified as input parameters and which are processed sequentially; and
wherein each current value of a corresponding HART variable is read from a communication area of the peripheral module concerned and is provided at an output until a next read.

7. A peripheral module which connects to Highway Addressable Remote Transducer (HART) field devices and which transmits different HART variables from at least one HART field device to a central processing unit (CPU) of a programmable logic controller, the at least one HART field device and the programmable logic controller being connected via buses to the peripheral module, and the peripheral module including an address space with an input area for data to be read by the CPU and an output area for data to be written by the CPU, comprising:
an address space having an input area and an output area and being configured to provide the HART variables in the input area of the address space for cyclic reading by the CPU of the programmable logic controller and to update them continuously; and
a communication area for transmitting an individual HART variable provided in the input and output area of the address space;
wherein the peripheral module is further configured to receive in the output area of the communication area a command of the CPU of the programmable logic controller specifying the HART variable currently to be read and to provide and continuously update each HART variable specified in the input area of the communication area until a time at which a new command which specifies another HART variable to be read, in the output area is received.

8. The peripheral module as claimed in claim 7, further comprising:
a plurality of channels for connecting a plurality of HART field devices;
wherein each specification of the HART variable to be read also specifies a channel of said plurality of channels which is delivering the HART variable.

9. The peripheral module as claimed in claim 7, wherein the peripheral module is further configured to provide each HART variable to be read in the input area together with an acknowledgement corresponding to the command.

10. The peripheral module as claimed in claim 8, wherein the peripheral module is further configured to provide each HART variable to be read in the input area together with an acknowledgement corresponding to the command.

11. The peripheral module as claimed in claim 7, further comprising:
at least one further communication area in the input and output area of its address space for transmitting a further HART variable is provided, such that HART variables specified by commands are provided independently of one another in parallel in at least two communication areas.

12. The peripheral module as claimed in claim 8, further comprising:
at least one further communication area in the input and output area of its address space for transmitting a further HART variable is provided, such that HART variables specified by commands are provided independently of one another in parallel in at least two communication areas.

13. The peripheral module as claimed in claim 9, further comprising:
at least one further communication area in the input and output area of its address space for transmitting a further HART variable is provided, such that HART variables specified by commands are provided independently of one another in parallel in at least two communication areas.

14. A central processor unit (CPU) of a programmable logic controller, configured to read Highway Addressable Remote Transducer (HART) variables of at least one HART field device via a peripheral module, the at least one HART field device and the programmable logic controller being connected via buses to the peripheral module, and the peripheral module including an address space with an input area for data to be read by the CPU and an output area for data to be written by the CPU, the CPU comprising:
- at least one channel block which represents a predetermined number of different HART variables and a corresponding number of inputs and outputs;
- wherein the HART variables are predetermined as input parameters and are processed sequentially by the channel block; and
- wherein each current value of a corresponding HART variable is cyclically read from a communication area of the peripheral module concerned and is provided at an output until a next read.

15. The CPU as claimed in claim 14, wherein the channel block has eight inputs and eight outputs.

16. The CPU as claimed in claim 14, wherein the channel block has an enabling input and an enabling output, via which said channel block is cascaded with further blocks.

* * * * *